US005557041A

United States Patent [19]
Sanford, Jr.

[11] Patent Number: 5,557,041
[45] Date of Patent: Sep. 17, 1996

[54] MODIFIED WATER METER ARRANGEMENTS

[76] Inventor: James W. Sanford, Jr., 101 Cusick La., Lenoir City, Tenn. 37772

[21] Appl. No.: 398,003

[22] Filed: Mar. 3, 1995

[51] Int. Cl.⁶ .................................................. G01F 15/14
[52] U.S. Cl. ............................................. 73/273; 73/201
[58] Field of Search ........................... 73/272, 273, 201, 73/198

[56] References Cited

U.S. PATENT DOCUMENTS

| | | | |
|---|---|---|---|
| 2,018,615 | 10/1935 | Lofton | 73/201 |
| 3,256,735 | 6/1966 | Smith | 73/201 |
| 3,301,051 | 1/1967 | Smith | 73/201 |
| 3,382,888 | 5/1968 | Mueller et al. | 73/201 |
| 3,444,724 | 5/1969 | Gilpin | 73/201 |
| 3,894,432 | 7/1975 | Coughlin | 73/201 |
| 5,085,076 | 2/1992 | Engelman | 73/197 |
| 5,303,583 | 4/1994 | Harris | 73/201 |

*Primary Examiner*—Richard Chilcot
*Assistant Examiner*—Harshad Patel
*Attorney, Agent, or Firm*—Dennison, Meserole, Pollack & Scheiner

[57] ABSTRACT

Modified water meter arrangements, and more particularly a modification kit for conducting various activities (e.g., repair, testing, monitoring, and the like) with respect to water meters typically employed by utility companies in monitoring usage of water by customers, are disclosed. By using the disclosed modification kit, utility company personnel can easily and more quickly conduct pressure checks, flow checks, bacteria checks, and meter checks, as well as lateral repairs. In carrying out some of these functions, the modification kit can be used with a conventional water meter while, in carrying out other functions, the modification kit is used in conjunction with an improved water meter in accordance with the invention.

20 Claims, 8 Drawing Sheets

MODIFIED WATER METER ARRANGEMENTS

DESCRIPTION

1. Technical Field

The present invention generally relates to modified water meter arrangements, and more particularly to a modification kit for conducting various activities (e.g., repair, testing, monitoring, and the like) with respect to water meters typically employed by utility companies in monitoring usage of water by customers. A kit for modifying water meter arrangements is also disclosed herein.

2. Background Art

As is well known in the art, water meters are typically installed between a general water supply line and the customer's individual supply line. Such conventional water meters comprise a device having a chamber through which water provided to the customer flows. A metering device or register is typically installed in the chamber, and measurement of water provided to the customer is thereby carried out.

In such conventional water meter arrangements, it is difficult and time-consuming, or even impossible, to conduct certain types of checks, such as pressure checks, flows checks and bacterial checks, and also to conduct various lateral repairs. In addition, such conventional arrangements do not provide the capability of testing the meter itself, the capability of back-flushing the water supply lines of the customer, or a convenient way of preventing the unauthorized use of water.

Thus, there is a need in the prior art for a modified water meter arrangement, and for a modification kit for modifying such water meter arrangements, so as to facilitate the conduct of pressure checks, flow checks, bacteria checks, water meter testing, lateral repairs, system flushing, and the like, and the prevention of unauthorized use of water.

The following patents are considered typical of the prior art relating to such water meter arrangements: U.S. Pat. Nos. 3,894,432; 5,085,076; and 5,303,583. However, such patents are burdened by the disadvantages of conventional water meter arrangements, as just described.

DISCLOSURE OF INVENTION

The present invention generally relates to modified water meter arrangements. In that regard, the present inventor has developed a modification kit for modifying conventional water meter arrangements so as to overcome the disadvantages of prior art arrangements, as described above.

In general, whereas water meters of the prior art typically have an input port or supply line side for receiving water from the supply line, an output port or customer side for supplying water to the customer, and a top access port through which access to the chamber of the water meter can be obtained for the purpose of inserting a metering device or register, the present invention calls for the establishment of an additional input/output port for supplying water to or receiving water from the customer via an additional line. In addition, the invention relates to the development of a modification kit for water meters, such kit comprising an adapter for insertion into the chamber of the water meter under certain circumstances, a cup having an aperture for insertion into the chamber of the water meter under certain circumstances, and an adapter for insertion into the additional access port under certain circumstances. The kit also includes a hose adapter and swivel adapter, which are utilized as required.

As a result of the modified water meter arrangement and use of the modification kit of the present invention, utility company personnel can easily and more quickly conduct various pressure checks, flow checks, bacteria checks, and meter checks, as well as lateral repairs. Moreover, such activities can be carried out in a much more timely manner, as compared to the time consumed in conducting such activities with prior water meter arrangements. Furthermore, in some instances (such as in the conduct of lateral repairs), the activities of the utility company personnel can be carried out without disturbing the customer, without requiring the customer to turn off the main water supply within the residence or facility, and such activities can be carried out with much less or no chance of damage to appliances (e.g., water heaters) within the residence or facility. Finally, in accordance with the present invention, unauthorized use of water can be prevented.

Therefore, it is a primary object of the present invention to provide modified water meter arrangements.

It is an additional object of the present invention to provide a modified water meter having an additional input/output port.

It is an additional object of the present invention to provide a modification kit for modifying conventional water meter arrangements.

It is an additional object of the present invention to provide a modified water meter arrangement which facilitates the testing of the existing meter at a residence or facility.

It is an additional object of the present invention to provide a modified water meter arrangement which facilitates back-flushing of the water supply facilities at a residence or other establishment.

It is an additional object of the present invention to provide a modified water meter arrangement for facilitating the checking of loss of flow within the water supply line to the residence or establishment.

It is an additional object of the present invention to provide a modified water meter arrangement for facilitating the conduct of lateral repairs within the water supply line to the residence or establishment.

It is an additional object of the present invention to provide a modified water meter arrangement for facilitating the checking of pressure within the water supply line to the residence or establishment.

It is an additional object of the present invention to provide a modified water meter arrangement for facilitating the conduct of a bacterial check within the water supply line to the residence or establishment.

It is an additional object of the present invention to provide a modified water meter arrangement for preventing unauthorized use of water.

Other objects of the invention and other advantages will become clear as a result of the following detailed description, the associated drawings, and the appended claims.

3

BEST MODE FOR CARRYING OUT THE INVENTION

The invention will now be described in more detail with reference to the various figures of the drawings.

Figure 1A:
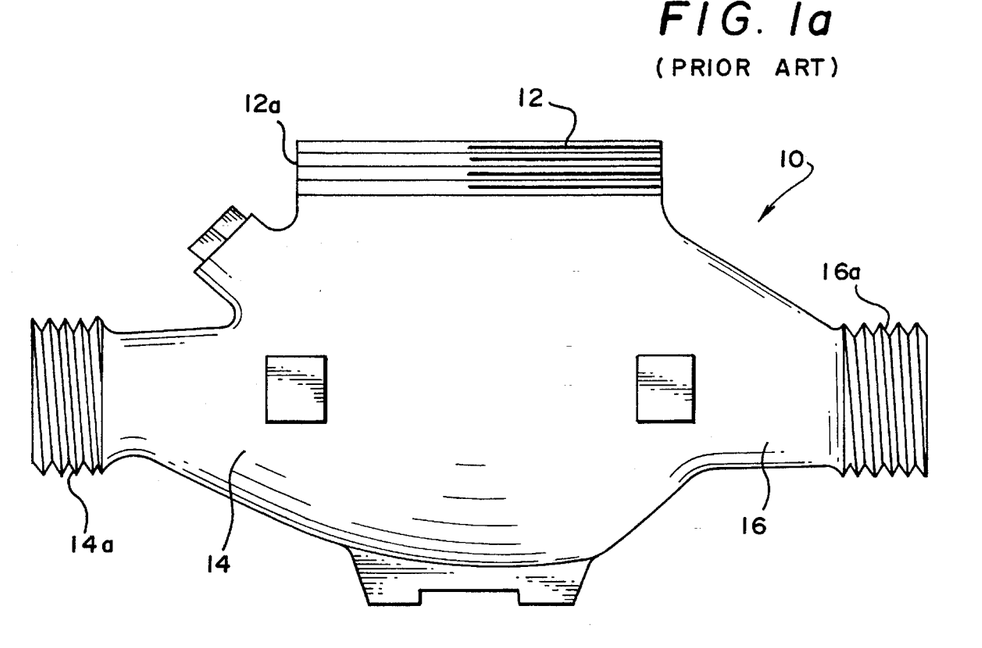
FIGS. 1A and 1B are a side view and top view, respectively, of a conventional water meter.
Figure 1B:
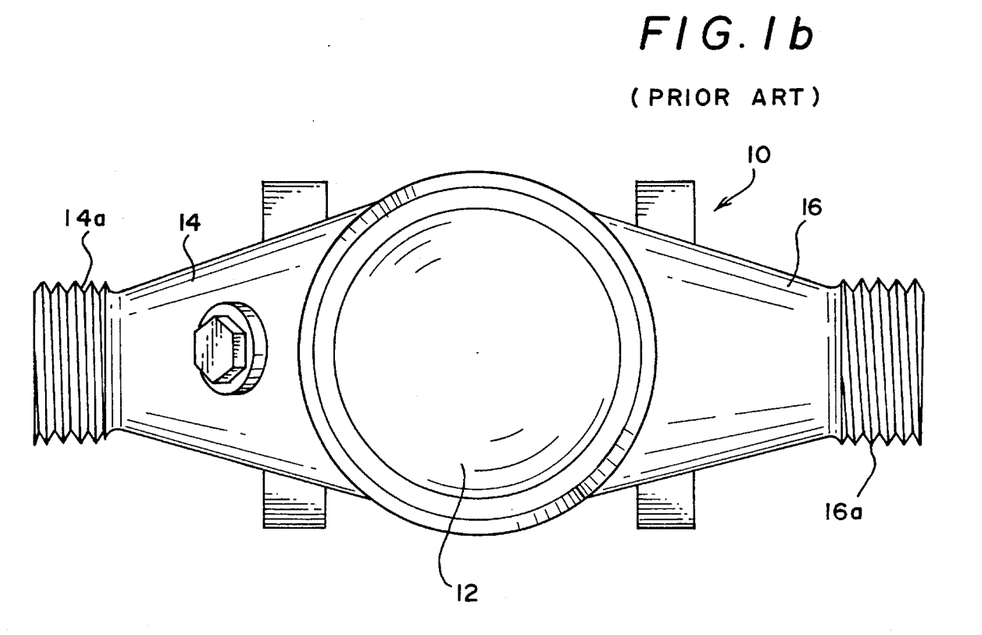

FIGS. 1A and 1B are a side view and top view, respectively, of a conventional water meter. As seen in FIGS. 1A and 1B, the conventional water meter 10 comprises a chamber 12, an end 14, and an opposite end 16. The end 14 is provided with threads 14a to facilitate connection of the water meter to a supply line which conducts water from a general supply line to the customer. The end 16 is provided with threads 16a for connecting the end 16 of the meter 10 to the individual supply line which conducts water to the customer's residence or establishment. The upper exterior portion of the meter 10 is provided with threads 12a to facilitate the connection of a top holder (to be described below) to the top portion of the meter 10, thereby closing the chamber 12.

Figure 2A:
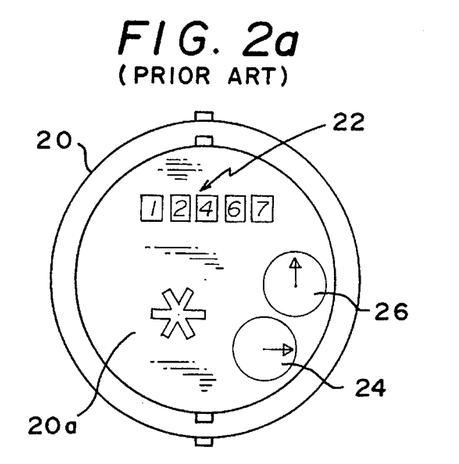
FIGS. 2A and 2B are a top view and bottom view, respectively, of a metering device or register typically employed in a water meter.
Figure 2B:
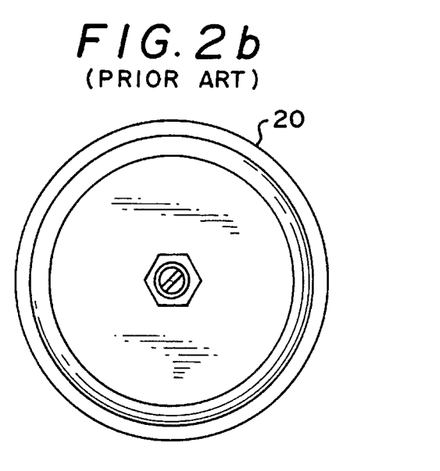
Figures 3A, 3B:
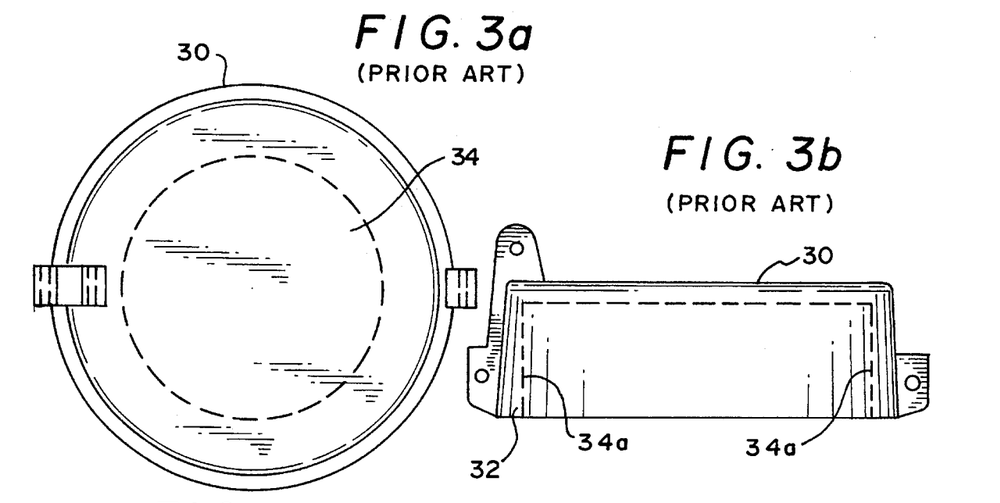
FIGS. 3A and 3B are a top view and side view, respectively, of a top holder typically employed with a water meter.

FIGS. 2A and 2B are a top view and bottom view, respectively, of a metering device or register typically employed in the conventional water meter. As seen in FIGS. 2A and 2B, the register 20 comprises a top surface 20a having display windows or indicators 22 for displaying the number of gallons consumed, as measured by the register 20. Also disposed on the top surface 20a are other measurement indicator devices 24 and 26, such devices being typical and well known to those of ordinary skill in the art. FIGS. 3A and 3B are a top view and side view, respectively, of a top holder for closing the top of the chamber 12 of the water meter 10 of FIGS. 1A and 1B. As seen in FIGS. 3A and 3B, the top holder 30 is generally cylindrical in nature and, as indicated by the dotted lines 34a in FIG. 3B, has a cup-like or cap-like contour which enables it to fit snugly over the threaded portion 12a of the meter 10 of FIG. 1A. Moreover, the interior vertical portion 34a of top holder 30 is threaded so that the top holder 30 can be screwed onto the threads 12a of the meter 10 of FIG. 1A.

Further referring to FIG. 3A, the top holder 30 has a central portion 34 which is open so that, when a register (such as the register 20 of FIGS. 2A and 2B) is installed in the chamber 12 of meter 10 (FIGS. 1A and 1B), the top surface 20a of register 20 (with its indicators 22, 24 and 26) shows through the opening 34 in top holder 30, thereby facilitating reading of the water meter usage indicators by utility personnel.

Figure 4A:
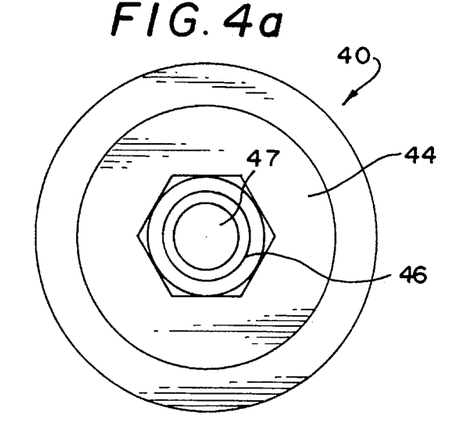
FIGS. 4A and 4B are a top view and side view, respectively, of an adapter contained in the modification kit of the present invention.
Figure 4B:
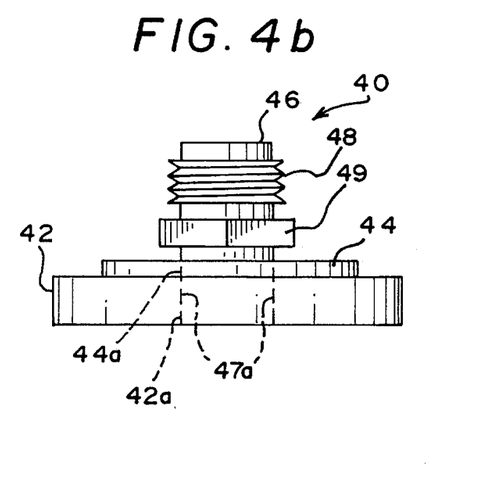

FIGS. 4A and 4B are a top view and side view, respectively, of an adapter included in the modification kit of the present invention. As seen in FIGS. 4A and 4B, the adapter 40 comprises a generally cylindrical portion 42, on top of which a smaller cylindrical portion 44 is integrally disposed. The cylindrical portions 42 and 44 have cylindrically shaped, hollow centers 42a and 44a, respectively.

The adapter 40 further comprises a generally cylindrical portion 46 which has a hollow interior 47. Cylindrical portion 46 is, as best seen in FIG. 4B, provided with a built-up and threaded portion 48, as well as with an hexagonally shaped built-up portion 49 located between the threaded portion 48 and the cylindrical portion 44. As indicated in FIG. 4B, the adapter 40 is fabricated so that the exterior dimensions of the cylindrical portion 46 register precisely and align with the cylindrically shaped, hollow centers 42a and 44a of the cylindrical portions 42 and 44, respectively.

Further referring to FIGS. 4A and 4B, preferably, the threaded portion 48 forms a ¾ inch garden hose thread, while the interior cylindrical wall 47a of the lower portion of cylindrical portion 46 of adapter 40 is threaded so as to form ¾ inch interior pipe threads.

Figure 5A:
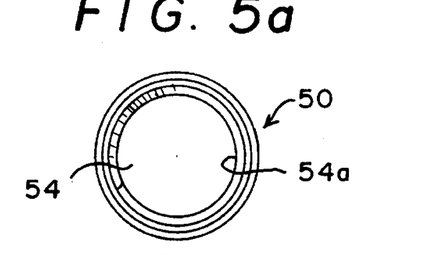
FIGS. 5A and 5B and a top view and side view, respectively, of a cap included in the modification kit of the present invention.
Figure 5B:
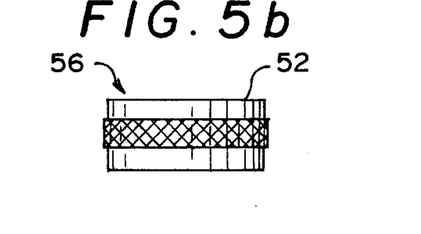

FIGS. 5A and 5B are a bottom view and side view, respectively, of a cap included in the modification kit of the present invention. As seen in FIGS. 5A and 5B, the cap 50 is generally cylindrical in shape, has a top surface 52 forming a closed end of the cylinder, but has an open bottom end 54. The interior cylindrical walls 54a of the cap 50 are threaded so as to form, preferably, a ¾ inch garden hose thread. Thus, the threaded interior walls 54a of cap 50 are compatible with the threaded portion 48 on the exterior upper cylindrical surface of the adapter 40 (previously described with reference to FIGS. 4A and 4B), so that the cap 50 can be screwed onto the top of the adapter 40, thereby sealing the cylindrical opening 47 in the adapter 40 at its top point.

Figure 6A:
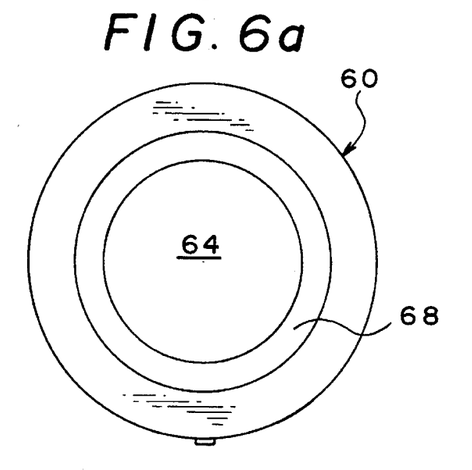
FIGS. 6A and 6B are a top view and side view, respectively, of a cup included in the modification kit of the present invention.
Figure 6B:
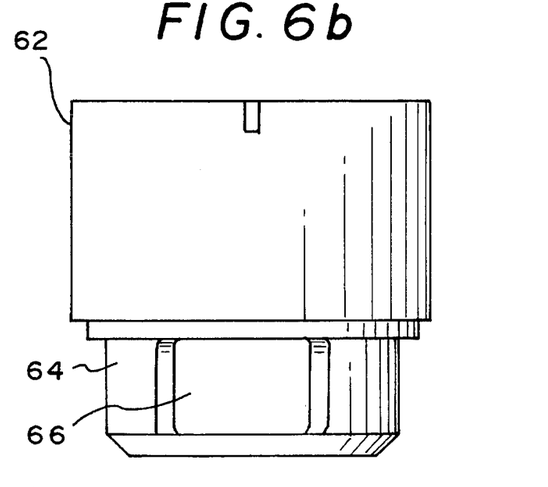

FIGS. 6A and 6B are a top view and side view, respectively, of a cup included in the modification kit of the present invention. As seen in FIGS. 6A and 6B, the cup 60 comprises an upper portion 62 which is generally cylindrical in shape and which has a hollow interior, and a lower portion 64 which is also generally cylindrical in shape and which also has a hollow interior, the diameter of the upper portion 62 being slightly larger than the diameter of the lower portion 64. The upper portion 62 and lower portion 64 are connected by a ledge portion 68, and the lower portion 64 has an aperture 66 formed in its vertical side wall.

Figure 7A:
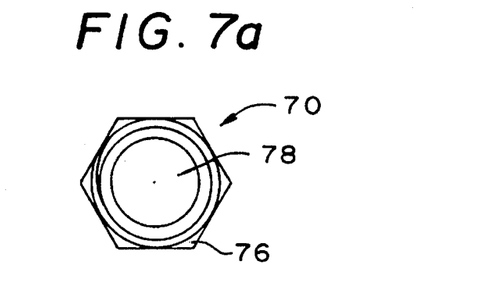
FIGS. 7A and 7B are a top view and side view, respectively, of a hose adapter included in the modification kit of the present invention.
Figure 7B:
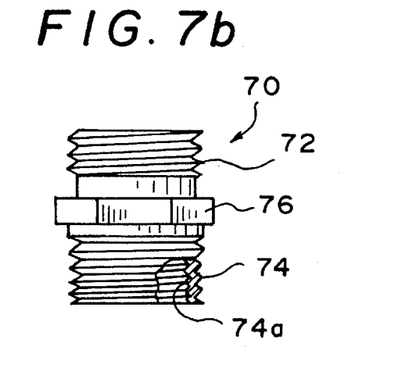

FIGS. 7A and 7B are a top view and side view, respectively, of a hose adapter included in the modification kit of the present invention. As seen in FIGS. 7A and 7B, the hose adapter 70 comprises an upper threaded portion 72 and a lower threaded portion 74 separated by a hexagonal nut portion 76. Preferably, the threaded portion 72 comprises a ¾ inch garden hose thread, while the threaded portion 74 comprises a ¾ inch pipe thread. As shown in FIG. 7A, the hose adapter 70 has a hollow interior 78, and the interior wall 74a of threaded portion 74 is also threaded.

Figure 8A:
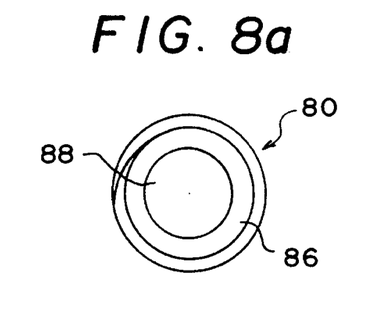
FIGS. 8A and 8B are a top view and side view, respectively, of a swivel adapter included in the modification kit of the present invention.
Figure 8B:
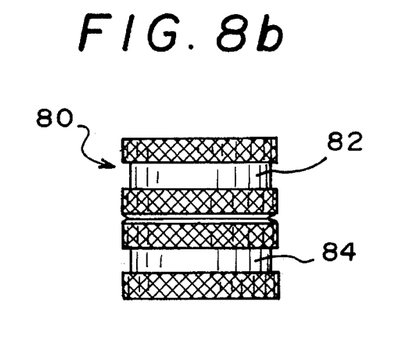

FIGS. 8A and 8B are a top view and side view, respectively, of a swivel adapter included in the modification kit of the present invention. As seen in FIGS. 8A and 8B, the swivel adapter 80 includes an upper portion 82 and a lower portion 84 joined together by an interior swivel ring 86, the interior 88 of the adapter 80 being hollow. The interior cylindrical walls of upper portion 82 and lower portion 84 are threaded, and preferably form a ¾ inch garden hose thread.

Figure 9A:
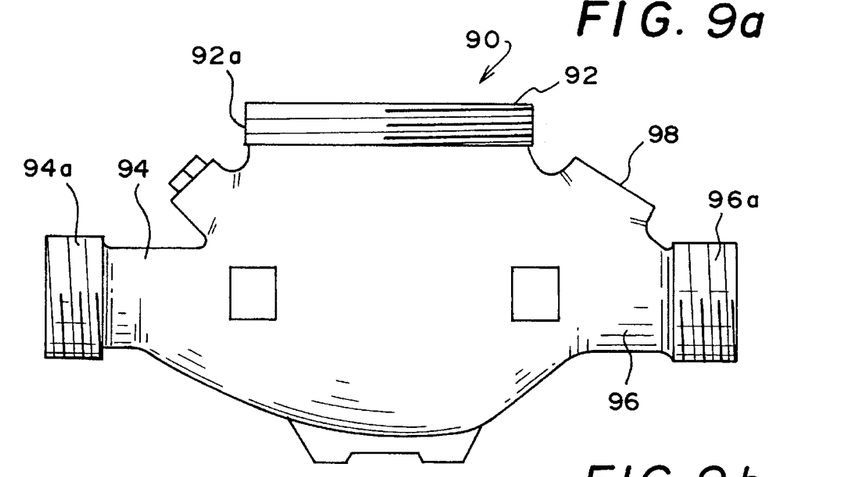
FIGS. 9A and 9B are a side view and top view, respectively, of a water meter modified in accordance with the present invention.
Figure 9B:
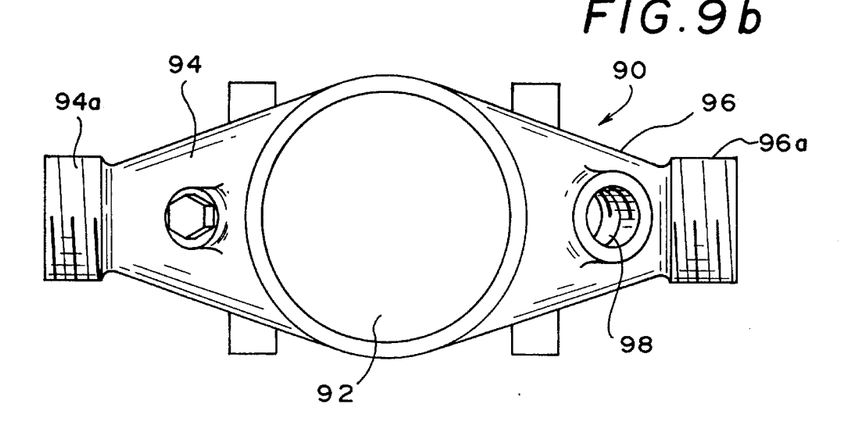

FIGS. 9A and 9B are a side view and top view, respectively, of a water meter constructed in accordance with the present invention. As seen in FIGS. 9A and 9B, the water meter 90 comprises a chamber 92 connecting an end 94 of the meter 90 with an end 96 thereof, the top of chamber 92 being provided with external threads 92a. The end 94 is provided with threaded portion 94a, while the end 96 is provided with threaded portion 96a.

In accordance with the present invention, the water meter 90 is provided with a boss or additional port 98, and the interior cylindrical surface of the boss 98 is threaded so as to form a ⅜ inch pipe thread.

Figures 10A, 10C:
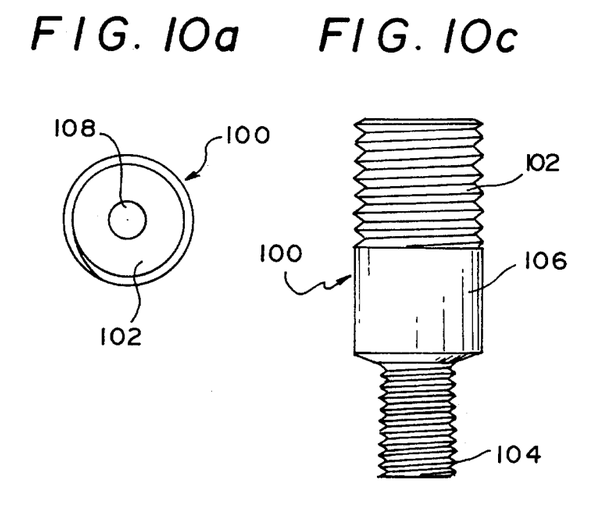
FIGS. 10A, 10B and 10C are a top view, bottom view and side view, respectively, of an adapter for use with the modified water meter of the present invention, as disclosed in FIGS. 9A and 9B.
Figure 10B:
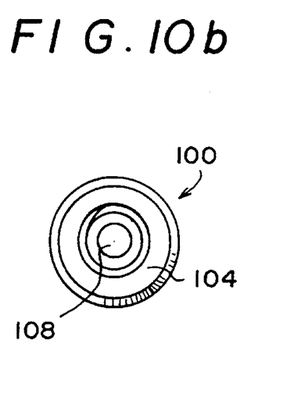

FIGS. 10A, 10B and 10C are a top view, bottom view and side view, respectively, of an adapter for use with the boss 98 of meter 90 of FIG. 9A. Referring to FIGS. 10A, 10B and 10C, the adapter 100 comprising an upper threaded portion 102 and a lower threaded portion 104 connected by a middle unthreaded portion 106. The upper threaded portion 102 is, preferably, a ¾ inch garden hose thread, while the lower portion 104 is, preferably, a ⅜ inch pipe thread. A cylindrical aperture 108 runs through the length of the adapter 100.

Figure 11:
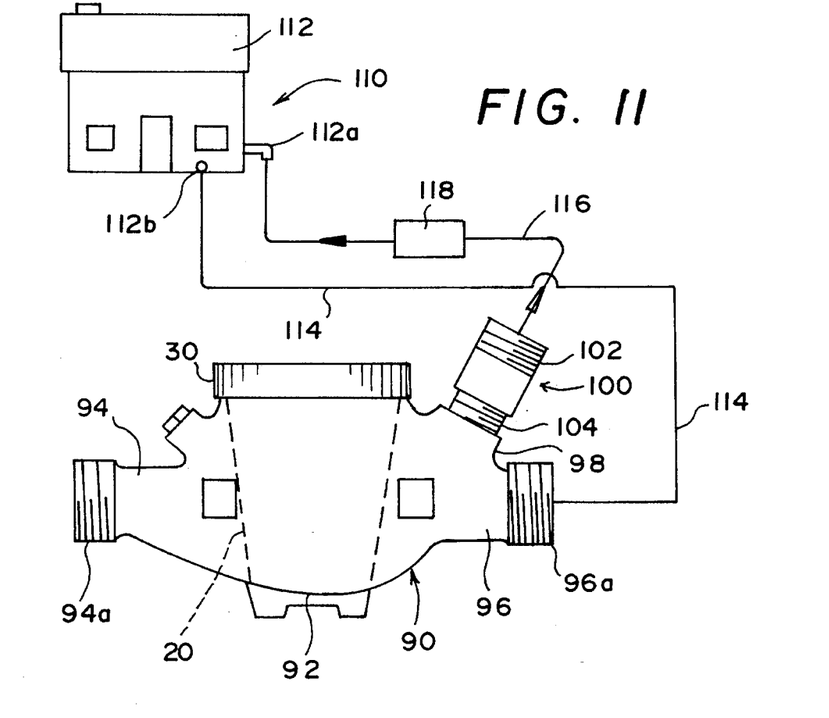
FIG. 11 is an illustration of an arrangement utilizing the present invention to test the metering device already in use at a residence or other establishment.

FIG. 11 is an illustration of a water meter arrangement 110 in which the meter of the present invention is used to test a water meter already in place. Specifically, the test is conducted with respect to the water supply facilities of a residence or building 112 having at least one faucet 112a and a main water supply cutoff valve 112b. It is presumed that, prior to establishing the test arrangement in accordance with the present invention, the customer's water meter 118 is in place between the general water supply line (not shown) and the customer's supply line 114; that is, the customer's water meter 118 is in the position which, in FIG. 11, is occupied by the water meter 90 of the present invention.

In order to establish the meter testing arrangement, the customer's meter 118 is removed from its position between the main water supply line and the customer's individual supply line 114, and the water meter 90 of the present invention is placed in the position previously occupied by the customer's meter 118, the meter 90 being equipped with a standard glass (not shown) and register 20 (FIGS. 4A and 4B). A plastic line (or other suitable line) 116 is run from the faucet 112a to the water meter 90, but the customer's meter 118 is inserted into the line 116, as shown in FIG. 11. The remote end of line 116 is connected to the upper portion 102 of adapter 100, the lower portion of adapter 100 being screwed into the boss 98.

This ensures that the path from faucet 112a through meter 118, adapter 100, end 96 and line 114 to main water supply cutoff value 112b constitutes a closed path. Thus, during the testing operation, the faucet 112a is opened and water flows through the closed path formed by line 116, meter 118, adapter 100, end 96, line 114 and cutoff valve 112b. In this manner, the meter 118 is tested for accuracy.

Figure 12:
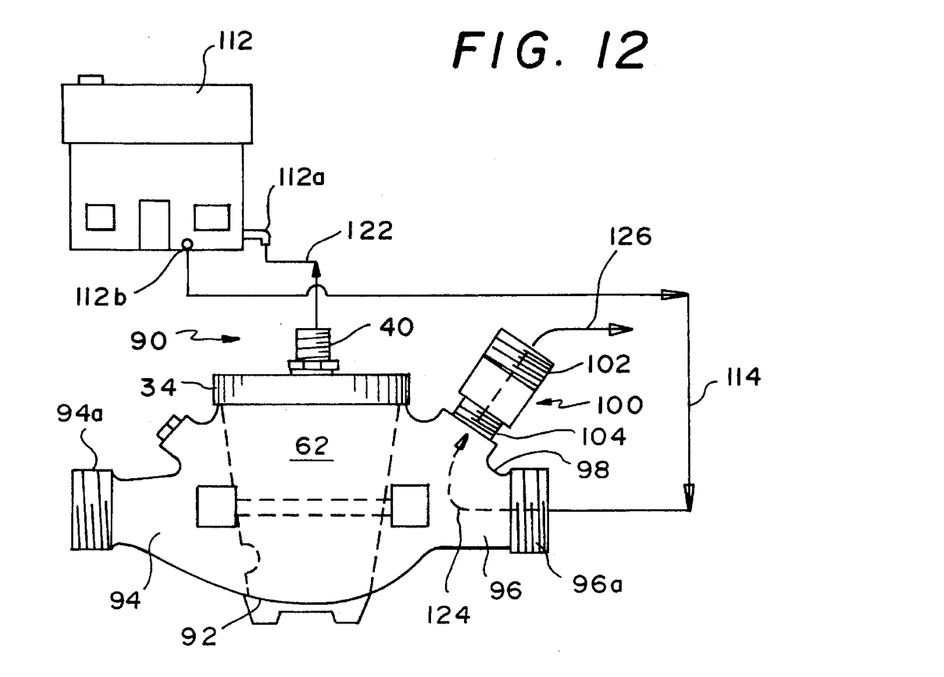
FIG. 12 is an illustration of an arrangement utilizing the water meter of the present invention to back-flush the water supply system of a residence or other establishment.

FIG. 12 is an illustration of an arrangement 120 in which the water meter of the present invention is used in a back-flushing operation. Since FIG. 12 is somewhat similar to FIG. 11, identical reference numerals are used to identify corresponding elements in the two figures.

As seen in FIG. 12, water meter 90 is installed between the main water supply line (not shown) and the customer's individual supply line 114, the line 114 being connected to the end 96 of meter 90. As was the case in the previous arrangement, the adapter 100 is mounted on the meter 90 by screwing the lower portion 104 thereof into the boss 98. In addition, top holder 30 (FIGS. 3A and 3B) is removed, register 20 (FIGS. 2A and 2B) is removed, and the cup 60 and adapter 40 is inserted in that sequence into chamber 92. In inserting the cup 60, the aperture 66 is aligned with end 94 of meter 90. Top holder 30 is then screwed onto the threaded portion 92a of chamber 92, and a ¾ inch garden hose line 122 is connected between the threaded portion 48 of adapter 40 and the faucet 112a.

The back-flushing operation is carried out by opening faucet 112a and opening water supply cutoff valve 112b so that water from the main supply line passes through end 94 (of meter 90), adapter 40, garden hose 122, faucet 112a, water supply cutoff valve 112b, line 114, end 96 (of meter 90), and adapter 100. Thus, the product of the flushing operation is emitted from the upper portion 102 of adapter 100.

Figure 13:
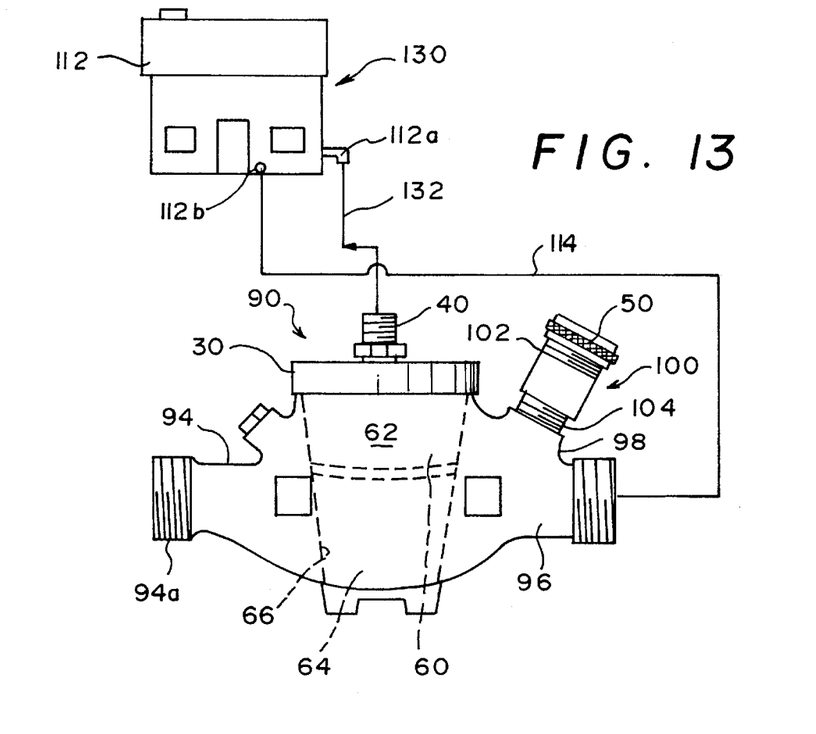
FIG. 13 is an illustration of an arrangement using the water meter of the present invention to check for loss of flow in the water supply line of a residence or other establishment.

FIG. 13 is an illustration of an arrangement 130 in which water meter 90 is utilized to check for loss of flow in the water supply system associated with a building. Again, since the arrangement shown in FIG. 13 is similar to those shown in FIGS. 11 and 12, identical reference numerals are used to designate common elements.

As seen in FIG. 13, meter 90 is positioned between the main water supply line (not shown) and the customer's individual supply line 114, the latter being connected in a conventional manner to the main water supply cutoff valve 112b. Prior to use in this operation, cutoff valve 112b is turned off and the adapter 100 positioned in the boss 98 is sealed at its top by screwing the cap 50 (previously discussed with reference to FIGS. 5A and 5B) onto the upper threaded portion 102 of adapter 100. However, it should be recognized that, for the purposes of this particular operation (checking for loss of flow), a conventional meter (such as meter 10 discussed above with reference to FIGS. 1A and 1B) could be employed since the boss 98 and adapter 100 are not needed for this operation.

In any event, prior to use of the meter 90 (or meter 10) in this operation, the top holder 30 is removed, the cup 60 and adapter 40 are inserted in that sequence into the chamber 92 (or 12), and top holder 30 is replaced. In inserting the cup 60, the aperture 66 is aligned with end 94 of meter 90 (or 10).

Once the adapter 40 is inserted into chamber 92 (or 12), and top holder 30 is replaced on meter 90 (or 10), a ¾ inch plastic pipe (or other appropriate line) 132 is connected at one end to the adapter 40 and at the other end to faucet 112a. Faucet 112a is opened, and a check for loss of flow is carried out by checking the open faucets (not shown) inside the house 112. More specifically, if an increase in flow of water out of the faucets of the house 112 is experienced, the technician can conclude that there is probably a problem in the line 114 between the meter 90 (or 10) and the house 112. Conversely, if the flow of water out of the faucets of the house 112 remains the same, this may indicate that the utility company has a problem in the main water supply line to the meter 90 (or 10).

Figure 14:
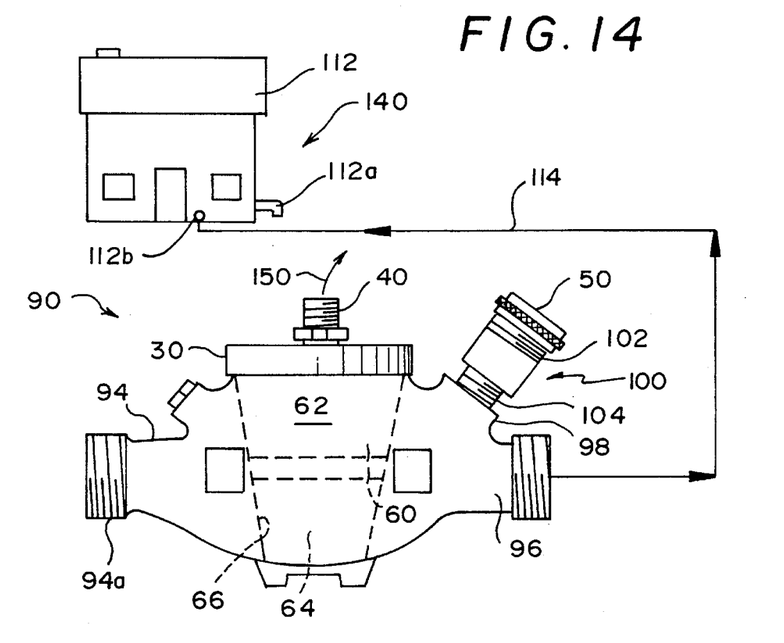
FIG. 14 is an illustration of an arrangement using the water meter of the present invention to perform lateral repairs.

FIG. 14 is an illustration of an arrangement using the water meter of the present invention when lateral repairs (that is, repairs to the main water supply line leading to the meter) are being performed. Since the arrangement shown in FIG. 14 is similar to those shown in FIGS. 11 and 12, identical reference numerals are used to designate common elements.

As seen in FIG. 14, meter 90 is positioned between the main water supply line (not shown) and the customer's individual supply line 114, the latter being connected in a conventional manner to the main water supply cutoff valve 112b. Prior to use in this operation, the adapter 100 positioned in the boss 98 is sealed at its top by screwing the cap 50 (previously discussed with reference to FIGS. 5A and 5B) onto the upper threaded portion 102 of adapter 100. However, it should be recognized that, for the purposes of this particular operation (lateral repairs), a conventional meter (such as meter 10 discussed above with reference to FIGS. 1A and 1B) could be employed since the boss 98 and adapter 100 are not needed for this operation.

In any event, prior to use of the meter 90 (or meter 10) in this operation, the top holder 30 is removed, the cup 60 and adapter 40 are inserted in that sequence into the chamber 92 (or 12), and top holder 30 is replaced. In inserting the cup 60, the aperture 66 is aligned with end 94 of meter 90 (or end 14 of meter 10).

Once the adapter 40 is inserted into chamber 92 (or 12) and top holder 30 is replaced on meter 90 (or 10), a ¾ inch plastic pipe (or other appropriate line) 150 is connected at one end to the adapter 40, the other end remaining unconnected for drainage purposes. Thus, the advantage of the arrangement of FIG. 14 resides in the fact that, during lateral repairs, backflow of contaminated or dirty water (containing mud, gravel and the like) into the customer's individual supply line is prevented. More specifically, once repairs are completed, and the water supply to the meter 90 (or 10) is restored, the arrangement 140 is designed to permit water to flow into the end 94 and cup 60 in water meter 90 (or 10), but cup 60 prevents flow of water into end 96, and the contaminated water instead flows out of the meter 90 (or 10) via adapter 40 into the hose line 150, which permits the water to drain into the ground or street. Once the main water supply line is clear of any debris or contamination, meter 90 (or 10) can be restored to its original condition by removing top holder 30, removing adapter 40 and cup 60, replacing the standard glass (not shown) and register 10 in the meter 90 (or 10), and then replacing top holder 30.

Figure 15:
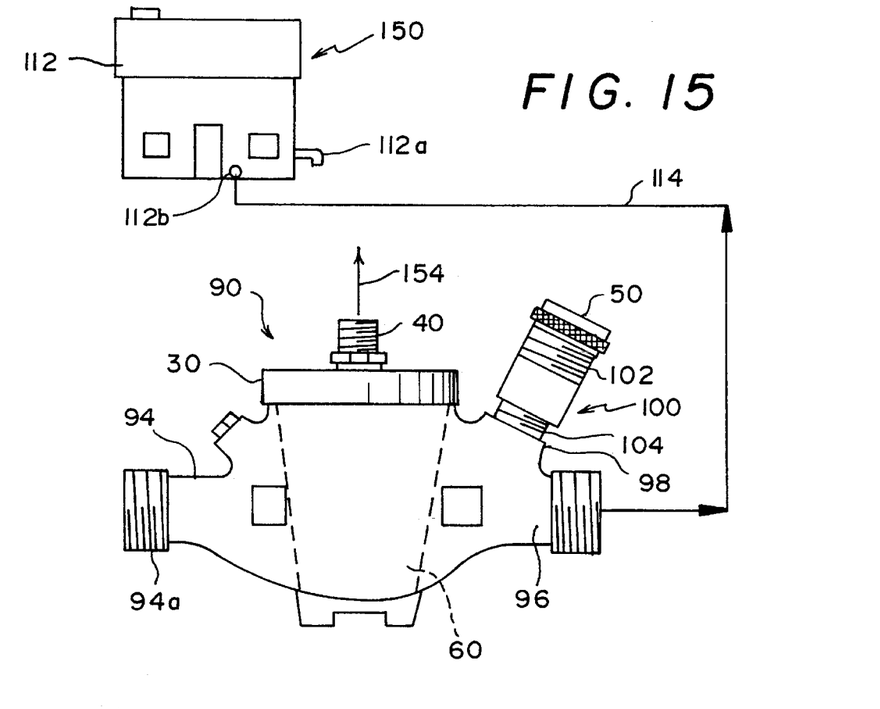
FIG. 15 is an illustration of an arrangement using the water meter of the present invention to check for bacteria in the water supply line of a residence or other establishment.

FIG. 15 is an illustration of an arrangement 150 in which water meter 90 is utilized to check for bacteria in the main water supply system associated with a building. Since the arrangement shown in FIG. 15 is similar to those shown in FIGS. 11 and 12, identical reference numerals are used to designate common elements.

As seen in FIG. 15, meter 90 is positioned between the main water supply line (not shown) and the customer's individual supply line 114, the latter being connected in a conventional manner to the main water supply cutoff valve 112b. Prior to use in this operation, the adapter 100 positioned in the boss 98 is sealed at its top by screwing the cap 50 (previously discussed with reference to FIGS. 5A and 5B) onto the upper threaded portion 102 of adapter 100. However, it should be recognized that, for the purposes of this particular operation (checking for bacteria), a conventional meter (such as meter 10 discussed above with reference to FIGS. 1A and 1B) could be employed since the boss 98 and adapter 100 are not needed for this operation.

In any event, prior to use of the meter 90 (or meter 10) in this operation, the top holder 30 is removed, the adapter 40 is inserted into the chamber 92 (or 12), and top holder 30 is replaced. Then, a copper tubing (or other appropriate tubing) 154 is connected at one end to the adapter 40. When the technician desires to take a sample for the purposes of a bacteria check, the other end of the copper tubing 154 is used to fill a receptacle with the sample to be tested.

The latter arrangement has significant advantages relative to prior art arrangements when it comes to the taking of a sample for bacterial check. In prior art arrangements, it is necessary to take the entire meter out of the ground, substitute a jumper in its place, and then take the sample; the entire process takes 45 minutes or longer to accomplish. In contrast, the present invention permits one to take a bacterial sample in the manner described above in 2 minutes or less.

Figure 16:
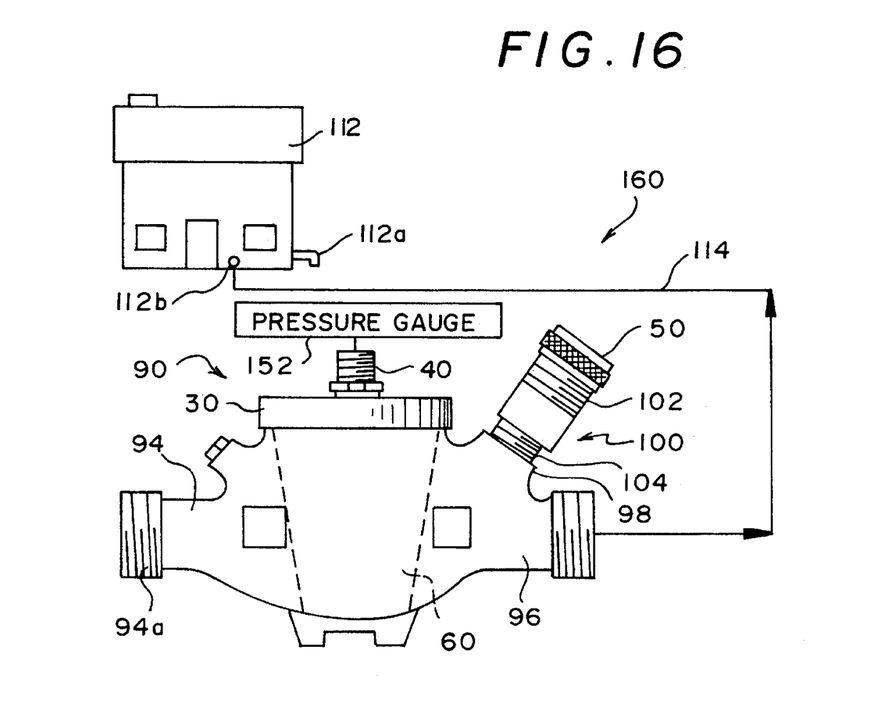
FIG. 16 is an illustration of an arrangement using the water meter of the present invention to check the pressure in the water supply line of a residence or other establishment.

FIG. 16 is an illustration of an arrangement 160 in which water meter 90 is utilized to check the pressure in the water supply system associated with a building 112. Since the arrangement shown in FIG. 16 is similar to those shown in FIGS. 11 and 12, identical reference numerals are used to designate common elements.

As seen in FIG. 16, meter 90 is positioned between the main water supply line (not shown) and the customer's individual supply line 114, the latter being connected in a conventional manner to the main water supply cutoff valve 112b. Prior to use in this operation, the adapter 100 positioned in the boss 98 is sealed at its top by screwing the cap 50 (previously discussed with reference to FIGS. 5A and 5B) onto the upper threaded portion 102 of adapter 100. However, it should be recognized that, for the purposes of this particular operation (checking the pressure), a conventional meter (such as meter 10 discussed above with reference to FIGS. 1A and 1B) could be employed since the boss 98 and adapter 100 are not needed for this operation.

In any event, prior to use of the meter 90 (or meter 10) in this operation, the top holder 30 is removed, the adapter 40 is inserted into the chamber 92 (or 12), and top holder 30 is replaced. A standard pressure gauge is then connected to the adapter 40. Alternatively, if the meter 90 of the present invention is already in place, the technician can remove the cap 50 from adapter 100, place the cap 50 on the top of adapter 40, and connect the pressure gauge to the adapter 100 instead. In either event, a pressure check of the line can be made using the present invention with very little modification to the existing water meter, thereby saving considerable time in the process.

Figure 17:
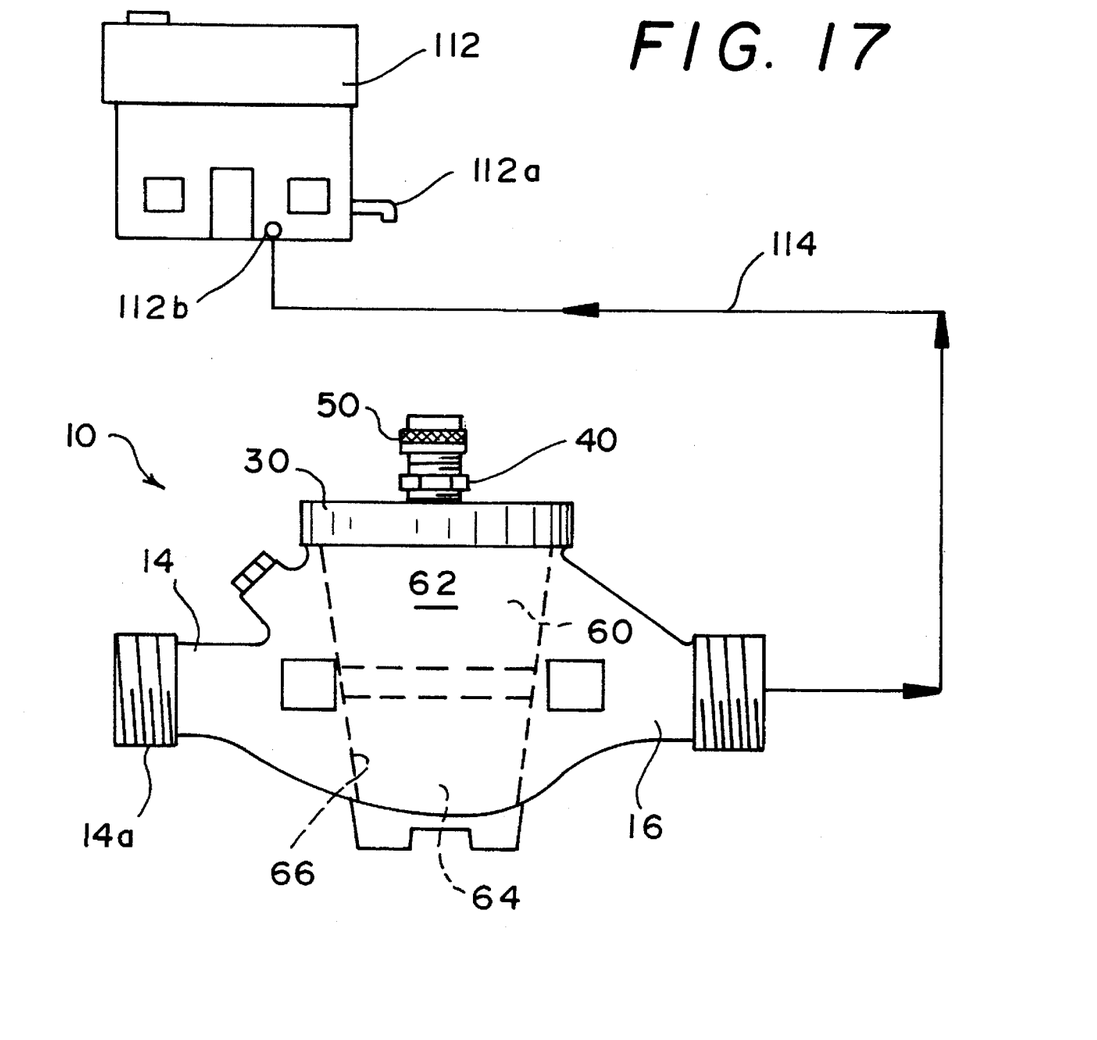
FIG. 17 is an illustration of an arrangement using the water meter of the present invention to prevent unauthorized use of water.

FIG. 17 is an illustration of an arrangement using the cup of the present invention to prevent unauthorized use of water. Since the arrangement shown in FIG. 17 is similar to the arrangements shown in previous figures, identical reference numerals are used to designate common elements.

As seen in FIG. 17, a conventional meter 10 is positioned between the main water supply line (not shown) and the customer's individual supply line 114, the latter being connected in a conventional manner to the main water supply cutoff valve 112b. It should be noted that the meter 90 of the present invention (as shown in FIGS. 9A and 9B) could be used so long as the boss 98 is sealed using the adapter 100 and the cap 50 of FIGS. 10A–10C and FIGS. 5A–5B, respectively.

In any event, prior to use of the meter 10 (or 90) in this operation, the top holder 30 is removed, the cup 60 and adapter 40 are inserted in that sequence into the chamber 12 (or 92), and top holder 30 is replaced. In inserting the cup 60, the aperture 66 is aligned with end 14 of meter 10 (or end 94 of meter 90). Adapter 40 is closed with cap 50. Once the top holder 30 is replaced, water from the main water supply line (not shown) is permitted to flow through the end 14 (or 94) of meter 10 (or 90), and into the cup 60 via aperture 66, but the cup 60 prevents further flow of the water into the end 16 of meter 10 (or end 96 of meter 90), and thus flow of water to the house 112 via customer supply line 114 is prevented.

While preferred forms and arrangements have been shown in illustrating the invention, it is to be understood that various modifications can be made without departing from the spirit and scope of this disclosure.

I claim:

1. A water meter comprising an input side, an output side, a chamber located between said input side and said output side, and an access port located above said chamber;

the improvement comprising an additional port formed in said output side of said meter, said additional port comprising means for receiving an adapter for connecting an additional water line to said meter; and selective blocking means insertable into said chamber for selectively blocking flow of liquid from said input side to said output side and for selectively allowing flow of liquid from said input side to said output side.

2. The water meter of claim 1, wherein said adapter comprises a generally cylindrical element, said means for receiving said adapter comprising threads formed on an interior cylindrical surface of said additional port, said adapter having a first end comprising an exterior threaded portion for compatibly engaging the threads formed on the interior cylindrical surface of said additional port.

3. The water meter of claim 2, wherein said adapter has a second end, said second end of said adapter having means for connecting said additional water line to said adapter.

4. The water meter of claim 3, wherein said means for connecting said additional water line to said adapter comprises external threads formed on said second end of said adapter, said meter further comprising a cap having a substantially cylindrical inner surface, said substantially cylindrical inner surface of said cap having threads corresponding to the external threads formed on said second end of said adapter, whereby said cap can be screwed onto said second end of said adapter so as to seal the adapter and the interior of said water meter to which said adapter is connected.

5. The water meter of claim 1, wherein said selective blocking means comprises a cup which is substantially cylindrical in shape, a cylindrical surface of said cup being discontinuous so as to form an aperture in a portion of said cylindrical surface, said cup being rotatable within the interior of said chamber so as to selectively align and not align said aperture with one of said input side and said output side of said water meter, thereby selectively blocking and allowing water to flow from said input side into said chamber and from said chamber into said output side.

6. A water meter having an input side, an output side, a chamber located between said input side and said output side, and an access port located above said chamber;

said water meter further comprising selective blocking means inserted into said chamber for selectively blocking flow of liquid from one of said input side and said output side into said chamber and for selectively permitting flow of liquid from one of said input side and said output side into said chamber.

7. The water meter of claim 6, wherein said selective blocking means comprises a cup having a substantially cylindrical surface, said substantially cylindrical surface of said cup being discontinuous so as to form an aperture therein, said cup being rotatable within said chamber when inserted therein.

8. The water meter of claim 7, said cup being rotatable into a first position wherein said aperture is aligned with said input side, thereby permitting flow of liquid between said input side and said chamber and blocking flow of liquid between said chamber and said output side;

said cup being rotatable into a second position wherein said aperture is aligned with said output side, whereby flow of liquid between said input side and said chamber is blocked, and flow of liquid between said chamber and said output side is permitted; and said cup being rotatable into a third position wherein said aperture is not aligned with any one of said input and output sides, whereby flow of liquid between said input side and said chamber and flow of liquid between said output side and said chamber are blocked.

9. The water meter of claim 6, further comprising adapter means disposed on top of said blocking means for securing said blocking means in said chamber.

10. The water meter of claim 9, wherein said adapter means has an end portion which is connectable to a water line so as to permit flow of water between said water line and said chamber via said adapter;

said water line has a first end and a second end, said first end is connected to said end portion of said adapter, and said second end is open, so that water is drained out of the chamber.

11. A method of testing a water meter normally in position between a main water supply and a facility, comprising the steps of:

(a) removing the water meter to be tested from its normal position between the main water supply line and the facility;

(b) connecting a side of the water meter to be tested via a water line to a faucet at the facility;

(c) providing a testing water meter having an input side, an output side, a chamber therebetween, and a port between the chamber and the output side;

(d) connecting another side of the water meter to be tested via a water line to the port of the testing water meter;

(e) connecting the input side of the testing water meter to the main water supply line and the output side of the testing water meter to a main cutoff valve at the facility;

(f) closing the main cutoff valve; and (g) opening the faucet at the facility so that water runs through the testing meter and the meter to be tested to the open faucet.

12. A method of back-flushing a water supply system at a facility, the facility having a faucet and a cutoff valve, the cutoff valve being connected via a supply line to one end of a water meter having a register contained therein, another end of the water meter being connected to the main water supply line, a chamber located between the two ends, said method comprising the steps of:

(a) providing the water meter with an additional port through which water can flow;

(b) opening the water meter and removing the register;

(c) inserting a cup having an aperture into the water meter so that the aperture is in alignment with the main supply line end of the water meter, inserting an adapter into the chamber and closing the water meter;

(d) connecting a top portion of the adapter via a water line to the faucet at the facility; and (e) opening the faucet and the cutoff valve at the facility so that water passes from the main water supply line through the adapter, the faucet, the cutoff valve, the supply line, the one end of the water meter, and the additional port of the water meter, thereby performing a back-flushing operation.

13. A method of checking for loss of flow in the water supply system at a facility, the facility having a cutoff valve to which a water meter is connected via a supply line, said water meter having a register contained therein, the facility having a faucet, said method comprising the steps of:

(a) opening the water meter and removing the register;

(b) providing a cup having an aperture contained therein;

(c) inserting the cup into the water meter and positioning the cup so that the aperture is in alignment with a main water supply line side of the water meter;

(d) inserting an adapter into the water meter above the cup, and closing the water meter;

(e) connecting a top portion of the adapter via a water line to the faucet at the facility; and (f) turning off the cutoff valve at the facility and checking the flow of water from faucets within the facility, thereby checking for loss of flow in the water supply line or in the main water supply.

14. A method of performing lateral repairs in a main water supply line serving a facility, the facility having a cutoff valve to which a water meter is connected via a supply line, the water meter having a register contained therein, said method comprising the steps of:

(a) opening the water meter and removing the register;

(b) providing a cup having an aperture contained therein;

(c) inserting the cup into the water meter so that the aperture is in alignment with a main water supply line side of the water meter;

(d) inserting an adapter into the water meter on top of the cup, and closing the water meter;

(e) connecting a hose line to a portion of the adapter for drainage purposes; and (f) completing the repairs, turning on the main water supply line, and permitting contaminated water or water containing debris to drain through the cup, the adapter and the hose line connected to the adapter.

15. A method of checking for bacteria in the main water supply line serving a facility, the facility having a cutoff valve to which a water meter is connected via a supply line, the water meter having a register contained therein, said method comprising the steps of:

(a) opening the water meter and removing the register;

(b) inserting an adapter into the water meter and closing the water meter;

(c) connecting a hose line to a top portion of the adapter for the purpose of collecting a sample for testing for bacteria; and (d) allowing water to flow from the main water supply line into the water meter, through the adapter, and through the hose line for the purpose of collecting a sample for testing for bacteria.

16. A method of performing a pressure check relative to a main water supply line serving a facility, the facility being connected via a supply line to a water meter, said method comprising the steps of:

(a) disposing an adapter in the water meter;

(b) connecting a pressure gauge to a top portion of the adapter;

(c) turning on the main water supply line to the water meter; and (d) using the pressure gauge to check for pressure in the main water supply.

17. The method of claim 16, wherein the meter has a register contained therein, and wherein step (a) comprises opening the meter, removing the register, inserting said adapter into the meter, and closing the meter.

18. The method of claim 16, wherein step (a) comprises providing the meter with an additional port, and connecting the pressure gauge to the additional port.

19. A method of preventing unauthorized use of water at a facility, the facility having a cutoff valve to which a water meter is connected via a customer supply line, said water meter being connected via a main water supply side thereof to a main water supply line, said water meter having a register contained therein, said method comprising the steps of:

(a) opening the water meter and removing the register;

(b) providing a cup having an aperture contained therein;

(c) inserting said cup into the water meter and positioning the cup so that the aperture is in alignment with the main water supply line side of the water meter and so that said cup blocks water flowing into the water meter from flowing into the customer supply line; and (d) inserting an adapter into the water meter above the cup, and closing the water meter.

20. A water meter positioned between a main water supply and a facility comprising:

an input side, two output sides, a chamber located between the input side and the output sides, wherein one output side is connected to a main cutoff valve of the facility and the other output side is connected to a meter to be tested so that water flows from the main water supply through both meters and into the facility.

* * * * *